United States Patent
Ito (10) Patent No.: US 9,733,635 B2
(45) Date of Patent: Aug. 15, 2017

(54) ELECTRIC MACHINE AND DISPLAY METHOD

(71) Applicant: Toshiba Kikai Kabushiki Kaisha, Chiyoda-ku, Tokyo-to (JP)

(72) Inventor: Takamichi Ito, Numazu (JP)

(73) Assignee: TOSHIBA KIKAI KABUSHIKI KAISHA, Tokyo-To (JP)

( * ) Notice: Subject to any disclaimer, the term of this patent is extended or adjusted under 35 U.S.C. 154(b) by 0 days.

(21) Appl. No.: 14/939,992

(22) Filed: Nov. 12, 2015

(65) Prior Publication Data
US 2016/0139604 A1 May 19, 2016

(30) Foreign Application Priority Data

Nov. 13, 2014 (JP) ................................ 2014-230686

(51) Int. Cl.
| | |
|---|---|
| G05B 15/02 | (2006.01) |
| H02K 11/00 | (2016.01) |
| H02P 6/08 | (2016.01) |
| H02P 21/18 | (2016.01) |
| H02P 21/20 | (2016.01) |

(52) U.S. Cl.
CPC ......... *G05B 15/02* (2013.01); *H02K 11/0015* (2013.01); *H02P 6/08* (2013.01); *H02P 21/18* (2016.02); *H02P 21/20* (2016.02)

(58) Field of Classification Search
CPC ....................................................... H02P 6/08
See application file for complete search history.

(56) References Cited

U.S. PATENT DOCUMENTS

| | | | |
|---|---|---|---|
| 6,365,075 B1 * | 4/2002 | Kamiguchi | B29C 45/76 264/40.3 |
| 7,728,536 B2 * | 6/2010 | Katsumata | H02P 21/02 318/400.02 |
| 2006/0276927 A1 * | 12/2006 | Uchiyama | B29C 45/5008 700/203 |
| 2009/0248229 A1 | 10/2009 | Okamura | |

(Continued)

FOREIGN PATENT DOCUMENTS

| | | |
|---|---|---|
| JP | 06-278173 | 10/1994 |
| JP | 07-015990 | 1/1995 |

(Continued)

OTHER PUBLICATIONS

English Language Abstract and Translation of JP 2013-55962 published on Dec. 26, 2013.

(Continued)

*Primary Examiner* — Shawki S Ismail
*Assistant Examiner* — Muhammad S Islam
(74) *Attorney, Agent, or Firm* — DLA Piper LLP US (57) ABSTRACT

An electric machine according to the embodiment includes: a motor; a current controller supplying a current to the motor; a detector detecting a position, a speed, or an acceleration of a shaft of the motor; a controller calculating a torque parameter indicating a torque of the motor based on a current instruction that specifies a supply current to the motor and calculating a speed parameter indicating a rotational speed of the shaft of the motor based on a detection result from the detector; and a display part displaying a graph showing a relation between the torque parameter and the speed parameter.

19 Claims, 6 Drawing Sheets

(56) References Cited

U.S. PATENT DOCUMENTS

| | | | |
|---|---|---|---|
| 2012/0104642 A1* | 5/2012 | Akasaka | B29C 45/77 264/40.3 |
| 2013/0063068 A1* | 3/2013 | Ueda | B30B 15/14 318/689 |
| 2013/0147078 A1* | 6/2013 | Matsubayashi | B29C 45/77 264/40.3 |
| 2014/0232306 A1* | 8/2014 | Yasui | H02P 6/00 318/400.02 |

FOREIGN PATENT DOCUMENTS

| | | |
|---|---|---|
| JP | H10-295092 | 11/1998 |
| JP | 2001-022419 | 1/2001 |
| JP | 2001-264357 | 9/2001 |
| JP | 4221470 B2 | 9/2009 |
| JP | 2013-059852 | 4/2013 |
| JP | 2013-255962 | 12/2013 |
| WO | WO 2012/014249 | 2/2012 |

OTHER PUBLICATIONS

English Language Abstract and Translation of JP 2001-264357 published on Sep. 9, 2001.
English Language Abstract and Translation of JP 2013-059852 published on Apr. 4, 2013.
English Language Abstract of JP 07-015990 published on Jan. 17, 1995.
English Language Abstract of JP 06-278173 published on Oct. 4, 1994.
English Language Abstract of JP 4421470 B2 published on Sep. 12, 2009.
Japanese Office Action (with English Translation) issued in JP 2014-230686 dated Mar. 21, 2017.
English Language Abstract and Translation of JP JP 2001-022419 dated Jan. 26, 2001.
English Language Abstract and Translation of WO 2012/014249 dated Feb. 2, 2012.
English Language Abstract and Translation of JP H10-295092 dated Nov. 4, 1998.

* cited by examiner

ELECTRIC MACHINE AND DISPLAY METHOD

CROSS REFERENCE TO RELATED APPLICATIONS

This application is based upon and claims the benefit of priority from the prior Japanese Patent Application No. 2014-230686, filed on Nov. 13, 2014, the entire contents of which are incorporated herein by reference.

BACKGROUND OF THE INVENTION

Field of the Invention

The embodiments of the present invention relate to an electric machine and display method.

Related Art

An electric machine such as an injection molding machine or a machine tool is driven by a motor. The torque of the motor of the electric machine is normally restricted by an upper limit of a current. To restrict a current flowing in the motor to a value equal to or lower than the upper limit, a threshold (a limit value) is set in a current instruction or a current detection value. When the current instruction or the current detection value exceeds the limit value, the electric machine clamps the current instruction to the limit value.

The upper limit of the current is kept at a high value when the rotational speed of the motor is relatively low. Therefore, the torque of the motor can be increased to be relatively high. However, when the rotational speed of the motor becomes relatively high, an induced voltage from the motor becomes close to a voltage applied to the motor and a voltage saturation state occurs, which decreases the upper limit of the current. Accordingly, when the rotational speed of the motor is relatively high, the torque of the motor cannot be increased to be so high. Therefore, it is preferable that the motor has a preferable range of a relation (hereinafter, "T-N characteristics") between the torque and the rotational speed of the motor and is controlled not to exceed the range of the T-N characteristics.

Conventionally, there is a case that when the torque or the rotational speed of the motor exceeds the preferable range of the T-N characteristics, the electric machine provides a warning indicating that the current has exceeded the upper limit to a user. For example, in the case of an injection operation of an injection molding machine, when the current exceeds the upper limit or the voltage saturation state occurs during the injection operation, there is a possibility that the motor cannot be controlled appropriately. In this case, the motor may vibrate abnormally or may break the machine or a mold. Accordingly, the electric machine provides a warning indicating that the current has exceeded the upper limit to a user.

The user can relax the operation condition of the motor in response to the warning. However, the user cannot know a margin produced by the relaxing of the operation condition to the upper limit of the current. It is also difficult for the user to know a load status on the motor in a motor operation condition.

The present invention has been achieved to solve the above problems and an object of the present invention is to provide an electric machine and a display method that enable a user to easily know a load applied on a motor.

SUMMARY OF THE INVENTION

An electric machine according to the embodiment includes: a motor; a current controller supplying a current to the motor; a detector detecting a position, a speed, or an acceleration of a shaft of the motor; a controller calculating a torque parameter indicating a torque of the motor based on a current instruction that specifies a supply current to the motor and calculating a speed parameter indicating a rotational speed of the shaft of the motor based on a detection result from the detector; and a display part displaying a graph showing a relation between the torque parameter and the speed parameter.

The torque parameter may be any one of a current value supplied to the motor, a rotation torque of the shaft of the motor, and an acceleration or pressure of a control target to be operated by the motor, or may be calculated from any one thereof, and the speed parameter may be the rotational speed of the shaft of the motor, or may be calculated from either a position or an acceleration of the shaft of the motor.

The torque parameter may have an upper limit, and the controller may control the current controller and the motor to prevent the torque parameter from exceeding the upper limit.

The controller may issue a warning when the torque parameter exceeds an upper limit.

The display part may display the torque parameter and the speed parameter almost in real-time with driving of the motor.

The display part may show change rates of the torque parameter and the speed parameter using widths or thicknesses of a line of the graph.

The display part may show any one of a temperature change of the motor, a rotation direction of the shaft of the motor, and a position or work process of a control target to be operated by the motor using colors of a line of the graph.

A display method performed in an electric machine according to an embodiment, the electric machine including a motor, a current controller supplying a current to the motor, a detector detecting a position, a speed, or an acceleration of a shaft of the motor, a controller transmitting a current instruction that specifies a supply current to the motor to the current controller, and a display part, the method includes:

causing the controller to calculate a torque parameter indicating a torque of the motor based on the current instruction that specifies a supply current to the motor;

causing the controller to calculate a speed parameter indicating a rotational speed of the shaft of the motor based on a detection result from the detector; and causing the display part to display a graph showing a relation between the torque parameter and the speed parameter.

The torque parameter may be any one of a current value supplied to the motor, a rotation torque of the shaft of the motor, and an acceleration or pressure of a control target to be operated by the motor, or may be calculated from any one thereof, and the speed parameter may be the rotational speed of the shaft of the motor, or is calculated from either a position or an acceleration of the shaft of the motor.

The torque parameter may have an upper limit, and the controller may control the current controller and the motor to prevent the torque parameter from exceeding the upper limit.

DETAILED DESCRIPTION OF THE INVENTION

Embodiments will now be explained with reference to the accompanying drawings. The present invention is not limited to the embodiments.

First Embodiment

Figure 1:
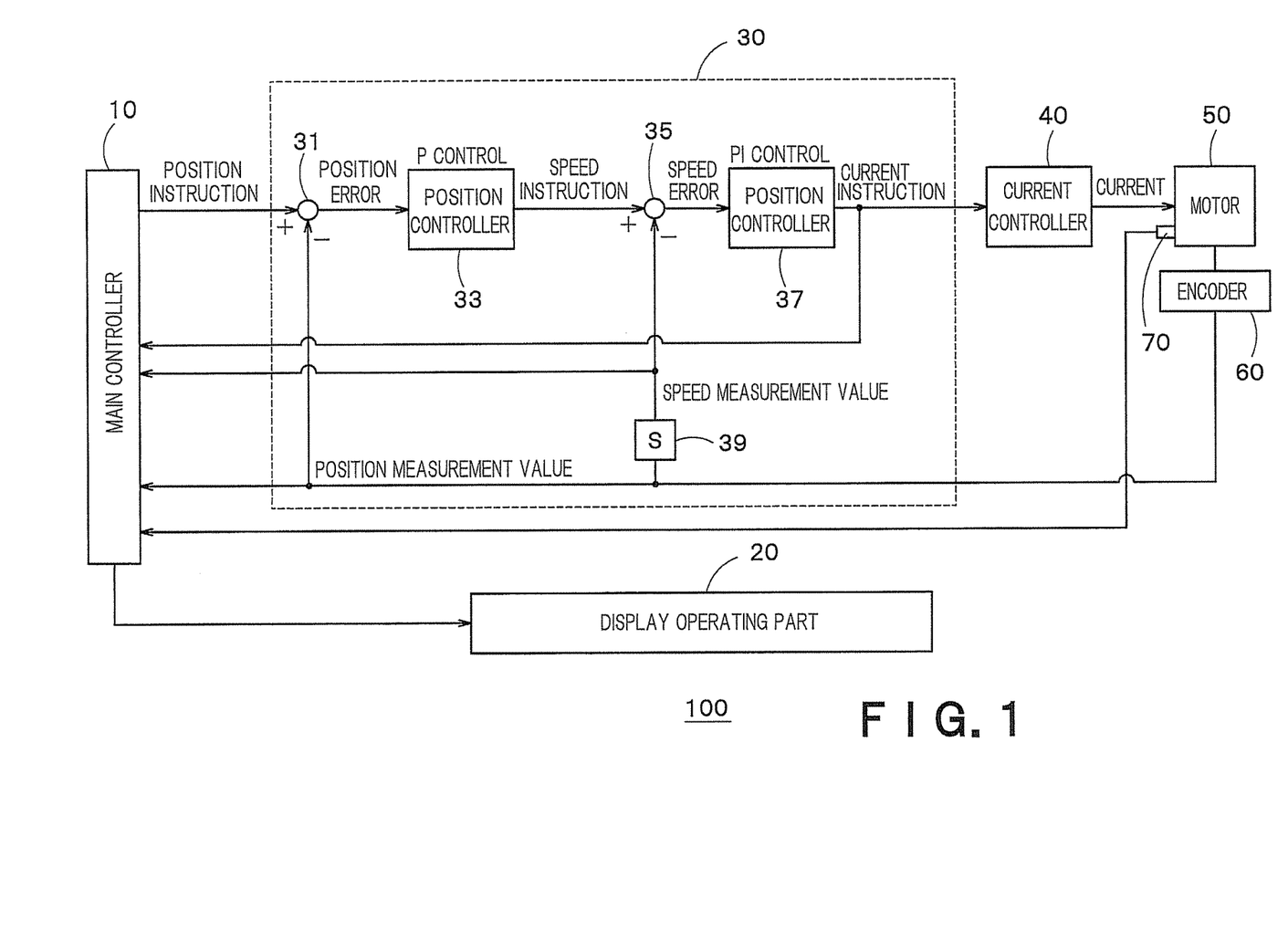
FIG. 1 is a block diagram showing a configuration example of an electric machine 100 according to a first embodiment.

FIG. 1 is a block diagram showing a configuration example of an electric machine 100 according to a first embodiment. The electric machine 100 is, for example, a machine tool, an injection molding machine, a die-cast machine, or an extrusion molding machine. The electric machine 100 includes a main controller 10, a display operating part 20, a servo controller 30, a current controller 40, a motor 50, and an encoder 60.

The main controller 10 creates a position instruction indicating a target position of the motor 50 to be controlled based on a set working condition and outputs the position instruction. The main controller 10 receives feedbacks such as a current instruction, a speed measurement value, and a position measurement value, performs computing thereof, and causes the display operating part 20 to display various types of information.

The servo controller 30 includes a subtractor 31, a position controller 33, a subtractor 35, a speed controller 37, and a speed computer 39. The subtractor 31 calculates a difference between the position instruction from the main controller 10 and a position measurement value actually detected and outputs the difference as a position error. The position controller 33 outputs a speed instruction indicating a target speed of the motor 50 based on the position error from the subtractor 31. The subtractor 35 calculates a difference between the speed instruction and a speed measurement value from the speed computer 39 and outputs the difference as a speed error. The speed controller 37 outputs a current instruction specifying a supply current to the motor 50 based on the speed error from the subtractor 35. The speed computer 39 computes the speed measurement value based on a change ratio of a plurality of the position measurement values. Alternatively, the speed computer 39 can convert the position measurement value to the speed measurement value by temporally differentiating the position measurement value.

Upon reception of the current instruction from the servo controller 30, the current controller 40 supplies a current corresponding to the current instruction to the motor 50. The motor 50 thereby operates (rotates) at the speed indicated by the speed instruction up to the position indicated by the position instruction.

The encoder 60 outputs a pulse each time the shaft of the motor 50 turns by a predetermined angle. Alternatively, the encoder 60 counts the pulses with respect to each sampling period, thereby outputting a rotational position (an angle) of the shaft of the motor 50 in each sampling period. The pulse or the rotational position of the shaft of the motor 50 is fed back to the subtractor 31, the speed computer 39, or the main controller 10. This enables the subtractor 31, the speed computer 39, or the main controller 10 to obtain the rotational position of the shaft of the motor 50. The rotational speed of the motor 50 can be calculated from the sampling period and the rotational position of the motor 50. This calculation can be alternatively performed by any one of the encoder 60, the speed computer 39, and the main controller 10.

Alternatively, the encoder 60 can detect a rotational speed (an angular velocity) or a rotational acceleration (an angular acceleration) of the motor 50. The main controller 10 can also obtain the rotational speed of the motor 50 by temporally differentiating the acceleration of the motor 50. In this manner, the main controller 10 can calculate the rotational speed of the shaft of the motor 50 based on a detection result from the encoder 60.

A parameter indicating the rotational speed of the shaft of the motor 50 is hereinafter referred to as "speed parameter". The speed parameter can be the number of the pulses from the encoder 60 with respect to each sampling period as well as the rotational speed of the motor 50.

The current instruction from the speed controller 37 is fed back to the main controller 10 and the main controller 10 calculates a rotation torque of the motor 50 based on the current instruction. The rotation torque of the motor 50 is calculated by multiplying the current value of the current instruction by a torque coefficient. A parameter indicating the rotation torque of the shaft of the motor 50 is hereinafter referred to as "torque parameter".

The torque parameter can be the rotation torque of the shaft of the motor 50 as described above, the current instruction, or a measurement value of the current supplied to the motor 50. It suffices that the torque parameter is a parameter corresponding to the rotation torque of the shaft of the motor 50 and the torque parameter can be, for example, an acceleration or pressure of a control target operated by the motor 50. This is because the acceleration or pressure of the control target corresponds (is proportional) to the rotation torque of the shaft of the motor 50 in some cases. The main controller 10 can calculate the rotation torque of the shaft of the motor 50 from any one of the current value supplied to the motor 50, the acceleration of the control target, and the pressure thereof. In this case, the torque parameter is a rotation torque calculated in the main controller 10.

The display operating part 20 is connected to the main controller 10 and displays various types of information such as a work condition, a work progress level, and power consumption. The display operating part 20 receives the torque parameter and the speed parameter from the main controller 10 and displays a graph showing a relation between the torque parameter and the speed parameter. An operator refers to the display operating part 20 and operates the display operating part 20 to select or change the work condition. The display operating part 20 can be incorporated in the electric machine 100 or can be a display of a PC (Personal Computer) outside the electric machine 100. The display operating part 20 can be a man-machine interface integrally formed with an operating part as a touch panel display. Needless to mention, the operating part can be provided separately from the display part.

Figure 2:
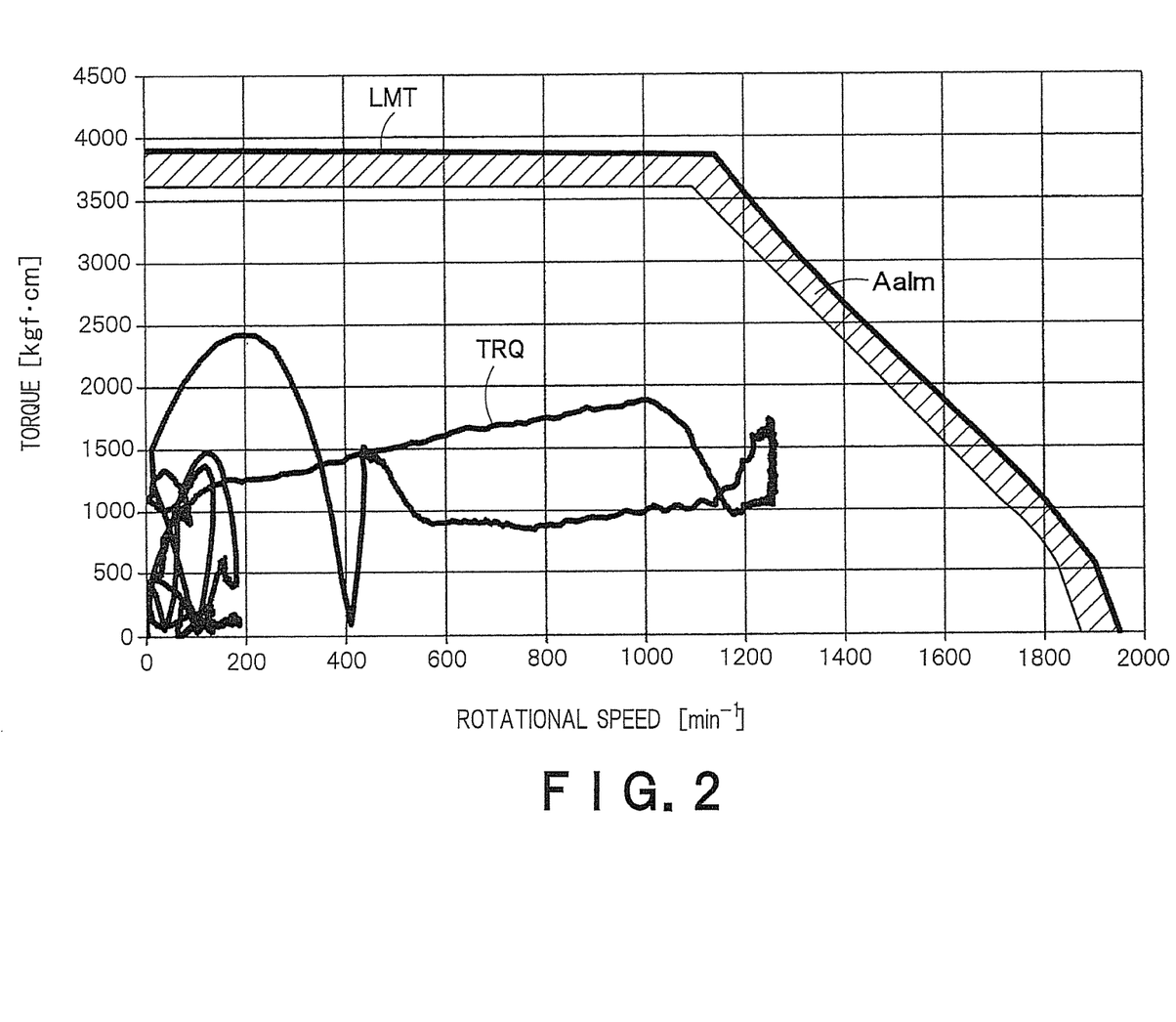
FIG. 2 is a graph showing an example of the relation between the torque parameter and the speed parameter displayed on the display operating part 20.
Figure 3:
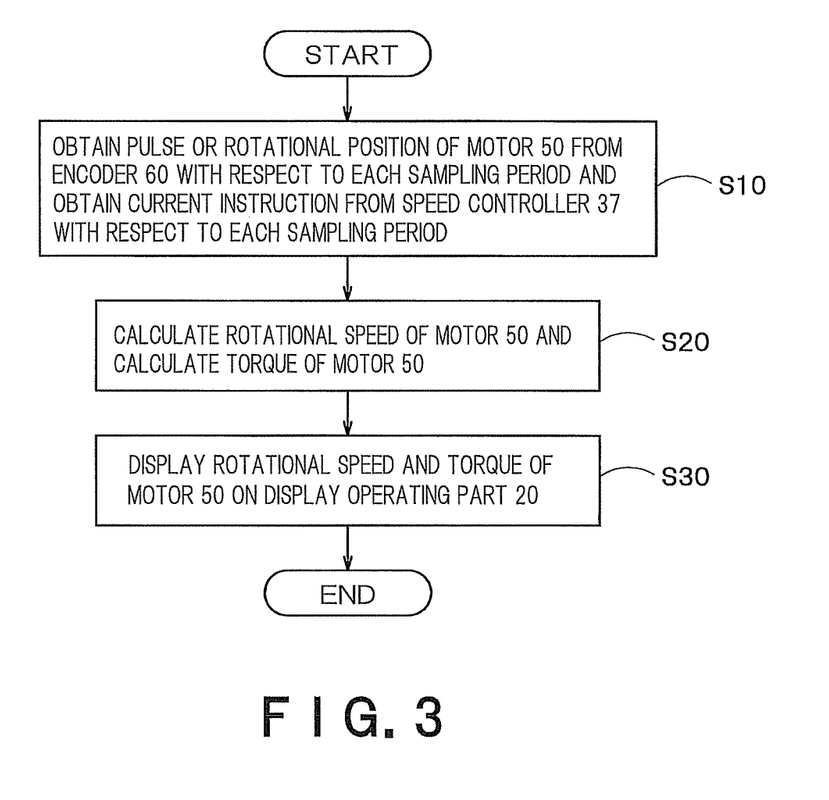
FIG. 3 is a flowchart showing an operation of the main controller 10 performed to display the relation between the torque parameter and the speed parameter.

FIG. 2 is a graph showing an example of the relation between the torque parameter and the speed parameter displayed on the display operating part 20. FIG. 3 is a flowchart showing an operation of the main controller 10 performed to display the relation between the torque parameter and the speed parameter.

The graph of FIG. 2 illustrates, for example, a relation between the torque parameter and the speed parameter of an injection molding machine. The horizontal axis represents the rotational speed ($min^{-1}$ or rpm) of the motor 50 and the vertical axis represents the torque (kgf·cm) of the motor 50. When the motor 50 is a linear motor, the vertical axis represents the thrust. That is, this graph illustrates T-N characteristics of the motor 50. The torque of the motor 50 is calculated by multiplying the current value of the current instruction from the speed controller 37 by the torque coefficient.

The horizontal axis can represent the speed of a control target or the number of pulses from the encoder 60 with respect to each sampling period instead of the rotational speed of the motor 50. That is, it suffices that the horizontal axis represents the speed parameter that can indicate the rotational speed of the motor 50. The vertical axis can represent the current value indicated by the current instruction or an actually-measured current value output from the current controller 40 instead of the torque of the motor 50. That is, it suffices that the vertical axis represents the torque parameter that can indicate the torque of the motor 50. As described above, the graph shown in FIG. 2 is a graph that enables the operator to know the T-N characteristics of the motor 50 when the operator refers to the display operating part 20.

The main controller 10 obtains the pulse or the rotational position of the motor 50 from the encoder 60 with respect to each sampling period (Step S10). Accordingly, the main controller 10 can calculate the rotational speed of the motor 50 (Step S20). Alternatively, the main controller 10 can receive the speed measurement value from the speed computer 39 and use the speed measurement value as it is as the rotational speed of the motor 50.

At the same time as Step S10 or before or after Step S10, the main controller 10 obtains the current instruction from the speed controller 37 with respect to each sampling period (Step S10). Accordingly, the main controller 10 can calculate the torque of the motor 50 (Step S20). Alternatively, the main controller 10 can receive the measurement value of the current from the current controller 40 to the motor 50 and calculate the torque of the motor 50 from the current measurement value. In this case, a current detector (not shown) is provided between the current controller 40 and the motor 50.

In this manner, the main controller 10 can calculate the rotational speed of the motor 50 as the speed parameter and can calculate the torque of the motor 50 as the torque parameter. The main controller 10 displays the rotational speed and the torque of the motor 50 on the display operating part 20 with respect to each sampling period almost in real-time with driving of the motor 50 (Step S30). A locus TRQ of the T-N characteristics shown in FIG. 2 is thereby obtained.

A limit line LMT in FIG. 2 shows an upper limit of the torque corresponding to the upper limit of the current supplied to the motor 50. As described above, the upper limit of the current is kept at a high value when the rotational speed of the motor 50 is relatively low while a voltage saturation state occurs and the upper limit of the current decreases when the rotational speed of the motor 50 becomes relatively high. The torque of the motor 50 has an identical tendency in proportion to the current. Therefore, also the limit line LMT is kept at a high value when the rotational speed of the motor 50 is relatively low while lowering when the rotational speed of the motor 50 becomes relatively high. For example, in the graph of FIG. 2, the limit line LMT starts lowering when the rotational speed of the motor 50 becomes equal to or higher than about 1150 rpm and becomes almost zero when the rotational speed of the motor 50 becomes equal to or higher than about 1950 rpm.

If the torque exceeds the limit line LMT, there is a possibility that the motor 50 cannot be appropriately controlled. In this case, the motor 50 may vibrate abnormally or break the machine or a mold. Therefore, the main controller 10 and the servo controller 30 need to control the motor 50 to prevent the torque from exceeding the limit line LMT.

When the T-N characteristics of the motor 50 approach the limit line LMT and enter a warning area Aalm, the main controller 10 issues a warning. The warning can be provided through display of warning information on the display operating part 20 or can be provided by another method such as a warning light or an alarm (not shown). When the TN characteristics of the motor 50 approach the limit line LMT and enter the warning area Aalm, the main controller 10 can automatically reduce the supply current to the motor 50 to protect the motor 50 or the control target as well as issuing the warning.

For example, when the motor 50 operates a screw that pushes out a molding material in a heated barrel of an injection molding machine, the locus TRQ is displayed as in the graph of FIG. 2. The rotational speed of the motor 50 increases when the molding material is injected into a mold. When the molding material is filled in the mold, the rotational speed of the motor 50 decreases and the torque increases. When the pressure is kept after the molding material is filled in the mold, the rotational speed of the motor 50 becomes almost zero. When the molding material is measured for the next injection, the torque and the rotational speed of the motor 50 both become negative to reverse the motor 50.

In FIG. 2, the display operating part 20 displays the respective absolute values of the rotational speed and the torque of the motor 50. Therefore, even when the rotational speed of the motor 50 has a negative value or the torque of the motor 50 has a negative value, the display operating part 20 displays the rotational speed and the torque to be overlapped in the first quadrant. This is because display of the absolute values of the rotational speed and the torque of the motor 50 only in the first quadrant suffices in order to recognize margins of the current or torque and the rotational speed to the respective upper limits. By thus displaying the T-N characteristics only in the first quadrant, the operator can know the margins of the current or torque and the rotational speed more easily.

A series of injection operations starts from the origin of the graph and ends at the origin. Because the T-N characteristics of the motor 50 in the injection operations have features in the respective stages as described above, the operator can know the locus TRQ in the respective stages by referring to the locus TRQ.

The electric machine 100 according to the first embodiment causes the display operating part 20 to display the graph showing the relation between the torque parameter and the speed parameter. Accordingly, the operator can easily know a load applied on the motor 50 by seeing the display operating part 20 and can easily know the margins of the current or torque and the rotational speed to the upper limits thereof.

According to the first embodiment, the main controller 10 causes the display operating part 20 to display the relation between the torque parameter and the speed parameter with respect to each sampling period almost in real-time. Therefore, the operator can monitor the relation in real-time during the operation of the motor 50. A malfunction can be thereby found in a short time and easily.

There is a case that the electric machine 100 repeatedly performs a series of sequence operations. In this case, the display operating part 20 can display the loci TRQ of the T-N characteristics corresponding to plural series of sequence operations in an overlapped manner. This enables temporal changes of the motor 50 to be easily checked.

Furthermore, the display operating part 20 can display the loci TRQ obtained by performing the operations under various conditions, with various molds, with various materials, or the like in an overlapped manner. Differences in the T-N characteristics depending on the conditions, the molds, the materials, or the like can be thereby easily checked.

Second Embodiment

Figure 4:
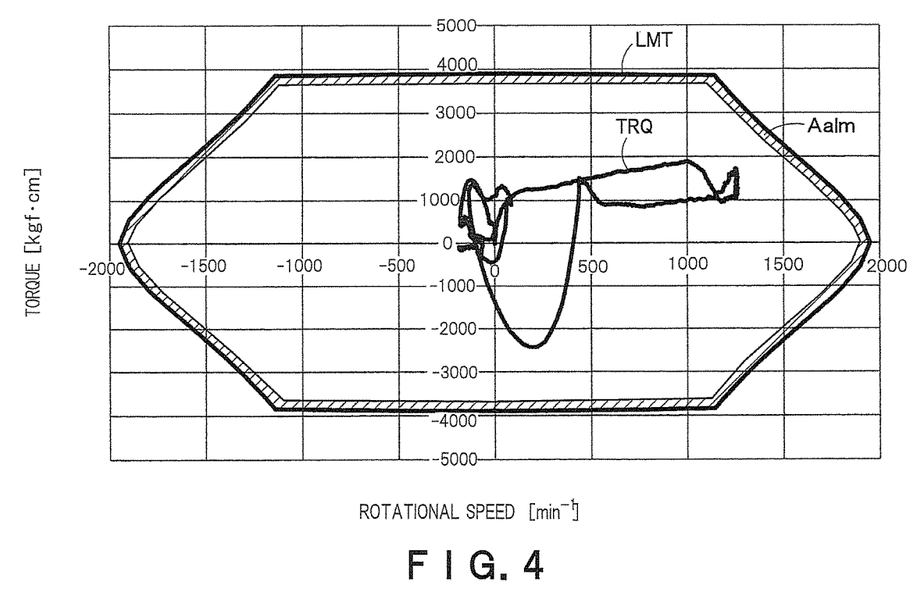
FIG. 4 is a graph showing an example of a relation between the torque parameter and the speed parameter according to a second embodiment.

FIG. 4 is a graph showing an example of a relation between the torque parameter and the speed parameter according to a second embodiment. In the second embodiment, the display operating part 20 displays the rotational speed and the torque of the motor 50 using the first to fourth quadrants. Other configurations and operations of the second embodiment can be identical to corresponding ones of the first embodiment. Accordingly, the second embodiment can obtain effects identical to those of the first embodiment.

Furthermore, when the rotational speed and the torque of the motor 50 are displayed in the four quadrants as in the second embodiment, respective signs (positive values or negative values) of the rotational speed and the torque of the motor 50 are clarified. This enables an operator to know whether the motor 50 is positively rotating or negatively rotating easily at once. The operator can also know whether the torque applied to the motor 50 is positive or negative easily at once. As a result, the operator can know the loci TRQ in the respective stages of a series of operations more easily.

Third Embodiment

Figure 5:
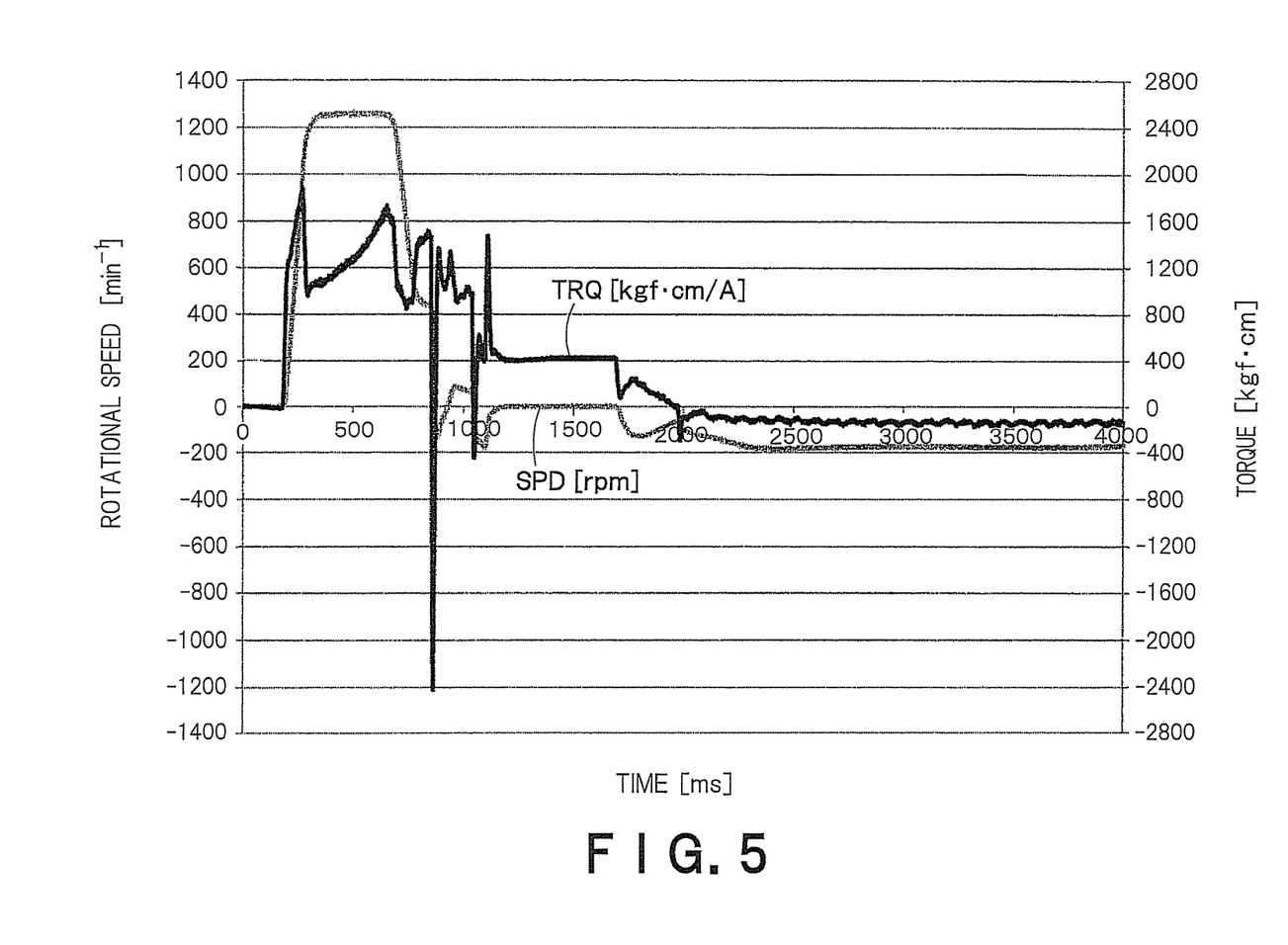
FIG. 5 is a graph showing an example of the relation between the torque parameter and the speed parameter according to a third embodiment.

FIG. 5 is a graph showing an example of the relation between the torque parameter and the speed parameter according to a third embodiment. In the third embodiment, the display operating part 20 plots both the torque parameter and the speed parameter on the vertical axis and plots the time on the horizontal axis. Other configurations and operations of the third embodiment can be identical to the corresponding ones of the first embodiment. Accordingly, the third embodiment can obtain the effects identical to those of the first embodiment.

Furthermore, when the time axis is displayed as in the third embodiment, an operator can know the respective stages of a series of operations more accurately. However, the limit line LMT as in the first and second embodiments cannot be drawn in the third embodiment.

First Modification of First or Second Embodiment

In the electric machine 100 according to a first modification, the display operating part 20 shows change rates of the torque parameter and the speed parameter of the motor 50 using widths (thicknesses) of the line of the locus TRQ in the graph.

This enables an operator to know a staying time of the motor 50 at a certain torque and a certain rotational speed.

Figure 6:
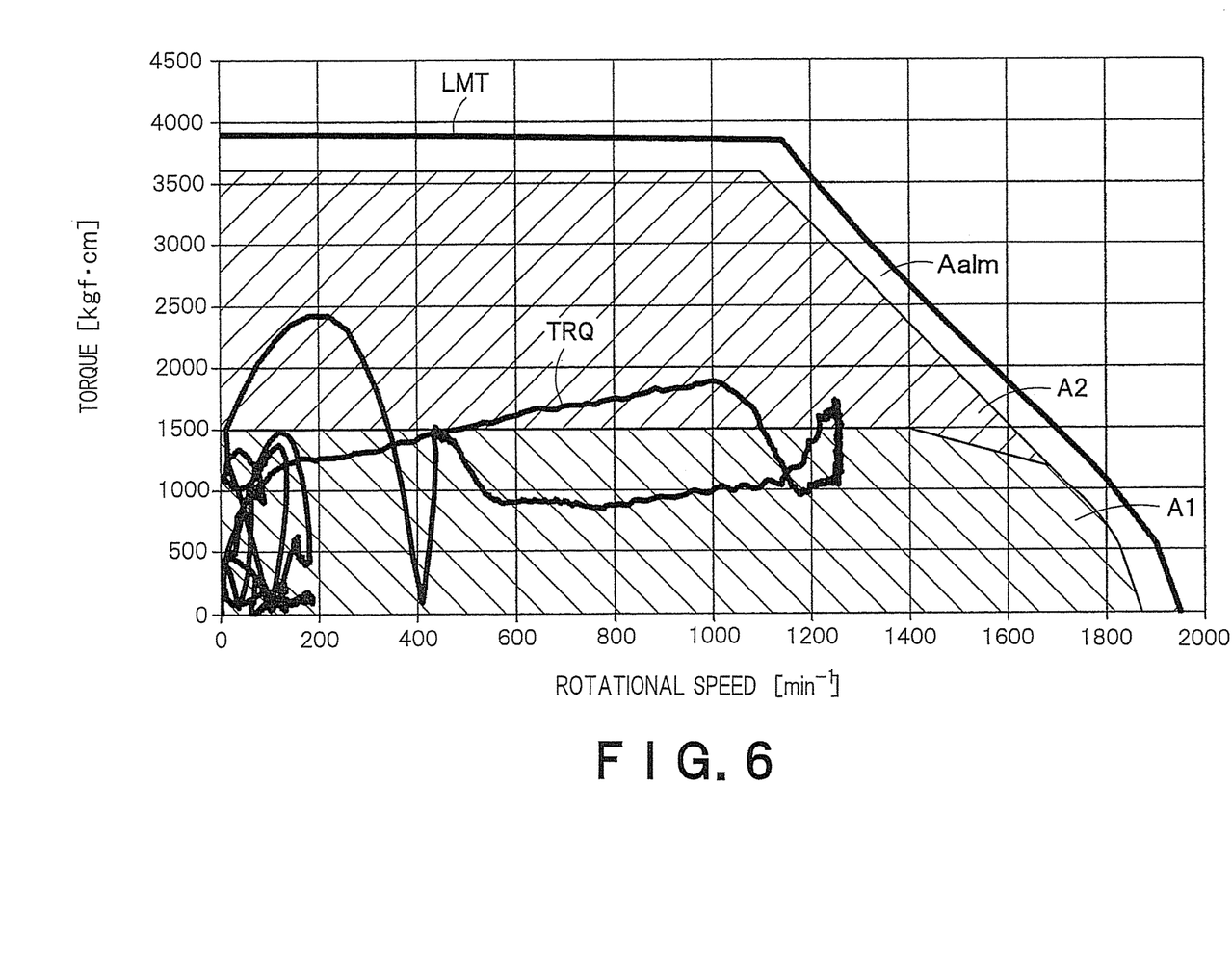
FIG. 6 shows a continuous area A1 and an acceleration/deceleration area A2.

Generally, the T-N characteristics have a continuous area and an acceleration/deceleration area within the limit line LMT. FIG. 6 shows a continuous area A1 and an acceleration/deceleration area A2. The continuous area A1 is an area of the T-N characteristics in which no problems occurs even when the motor 50 is continuously driven and is an area in which the torque is relatively low. The acceleration/deceleration area A2 is an area of the T-N characteristics in which a problem such as heat generation can occur when the motor 50 is continuously driven and is an area in which the torque is relatively high. The acceleration/deceleration area A2 is an area that can be used temporarily only for a short time when the rotational speed of the motor 50 is to be increased or decreased.

According to the first modification, the operator can know the staying times of the motor 50 in the continuous area A1 and the acceleration/deceleration area A2. When the locus TRQ in the continuous area A1 is thick, the operator can determine that there is no problem in the operation condition. If the locus TRQ in the acceleration/deceleration area A2 is thick, the operator changes the operation condition as necessary. In this manner, according to the first modification, the operator can set the operation condition with reference to the line width (thickness) of the locus TRQ. The first modification can be applied to the first or the second embodiment.

Second Modification of First to Third Embodiments

In the electric machine 100 according to a second modification, the display operating part 20 shows one of the temperature change of the motor 50, the rotation direction of the shaft of the motor 50, and the position or work process of a control target to be operated by the motor 50 using the color of the line of the locus TRQ. This enables an operator to easily know one of the temperature change of the motor 50, the rotation direction of the shaft of the motor 50, and the position of the control target to be operated by the motor 50 in the graph of the T-N characteristics.

When the temperature change of the motor 50 is represented by the color of the line of the locus TRQ, a temperature sensor 70 is further provided for the motor 50 as shown in FIG. 1. The temperature sensor 70 measure the temperature of the motor 50 with respect to each sampling period almost in real-time and transmits the temperature measurement value to the main controller 10 with respect to each sampling period. The main controller 10 changes the color of the locus TRQ based on the temperature measurement value. For example, the main controller 10 displays the locus TRQ in blue when the temperature of the motor 50 is lower than a first threshold and the main controller 10 displays the locus TRQ in green when the temperature of the motor 50 exceeds the first threshold. The main controller 10 displays the locus TRQ in yellow when the temperature of the motor 50 exceeds a second threshold (the second threshold>the first threshold). Thereafter, as the temperature increases, the main controller 10 changes the color of the locus TRQ to orange and then red. Accordingly, by referring to the locus TRQ displayed on the display operating part 20, the operator can know the temperature of the motor 50 as well as the T-N characteristics intuitively and easily. The temperature of the motor 50 indicates a load applied on the motor 50. Therefore, when the temperature of the motor 50 is known, the operator can know the load applied on the motor 50. The operator also can change setting of the work condition of the electric machine 100 based on the load applied on the motor 50. The main controller 10 can reduce the supply current to the motor 50 automatically when the temperature of the motor 50 is high. The motor 50 or the control target can be thereby protected.

When the rotation direction of the shaft of the motor 50 is represented by the color of the line of the locus TRQ, the main controller 10 changes the color of the line of the locus TRQ in accordance with, for example, the sign (a positive value or a negative value) of the rotational speed of the shaft of the motor 50. For example, when the motor 50 is rotating in a first rotation direction (the rotational speed has a positive value, for example), the main controller 10 sets the color of the line of the locus TRQ to blue. When the motor 50 is rotating in a second rotation direction opposite to the first rotation direction (the rotational speed has a negative value, for example), the main controller 10 sets the color of the line of the locus TRQ to red. This enables the operator to know the rotation direction of the motor 50 intuitively and easily. For example, in the first embodiment, the display operating part 20 shows the T-N characteristics of the motor 50 as the absolute values using only the first quadrant. When the rotation direction of the shaft of the motor 50 is represented by the color of the line of the locus TRQ as described above, the operator can know a relation between the T-N characteristics and the rotation direction of the motor 50 intuitively and easily even when the T-N characteristics are displayed only in the first quadrant.

The display operating part 20 can show the position of the control target to be operated by the motor 50 using the color of the line of the locus TRQ. For example, when the control target is a mold, the main controller 10 changes the color of the line of the locus TRQ in accordance with the position of the mold. The operator can thereby know a relation between the T-N characteristics and the position of the mold intuitively and easily.

The display operating part 20 can show the work process using the color of the line of the locus TRQ. For example, the main controller 10 changes the color of the line of the locus TRQ in accordance with respective stages (mold closing, voltage step-up, filling, pressure keeping, measurement, mold opening, and extrusion, for example) of injection molding. This enables the operator to know a relation between the T-N characteristics and the respective stages of the injection molding intuitively and easily.

At least a part of a data processing method performed in the main controller 10 according to the above embodiments can be configured by hardware or software. When a part of the data processing method is configured by software, a program for achieving at least some functions of the data processing method can be held in a recording medium such as a flexible disk or a CD-ROM and be read by a computer to be executed therein. The recording medium is not limited to a removable medium such as a magnetic disk or an optical disk and a fixed recording medium such as a hard disk drive or a memory can be applied thereto. The program for achieving at least some functions of the data processing method can be distributed through a communication line (including a wireless communication line) such as the Internet. The program can be distributed in an encrypted, modulated, or compressed state via a wired line or a wireless line such as the Internet or via a recording medium that holds therein the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An electric machine comprising:
a motor;
a current controller configured to supply a current to the motor;
a detector configured to detect a position, a speed, or an acceleration of a shaft of the motor;
a controller configured to calculate a torque parameter indicating a torque of the motor based on a current instruction that specifies a supply current to the motor and calculating a speed parameter indicating a rotational speed of the shaft of the motor based on a detection result from the detector; and
a display part configured to display a graph showing a relation between the torque parameter and the speed parameter, wherein one of a horizontal axis and a vertical axis of the graph represents the torque parameter and the other of the horizontal axis and the vertical axis represents the speed parameter.

2. The machine of claim 1, wherein
the torque parameter is any one of a current value supplied to the motor, a rotation torque of the shaft of the motor, and an acceleration or pressure of a control target to be operated by the motor, or is calculated from any one thereof, and
the speed parameter is the rotational speed of the shaft of the motor, or is calculated from either a position or an acceleration of the shaft of the motor.

3. The machine of claim 1, wherein
the torque parameter has an upper limit, and
the controller is configured to control the current controller and the motor to prevent the torque parameter from exceeding the upper limit.

4. The machine of claim 2, wherein
the torque parameter has an upper limit, and
the controller is configured to control the current controller and the motor to prevent the torque parameter from exceeding the upper limit.

5. The machine of claim 1, wherein the controller is configured to issue a warning when the torque parameter exceeds an upper limit.

6. The machine of claim 2, wherein the controller is configured to issue a warning when the torque parameter exceeds an upper limit.

7. The machine of claim 3, wherein the controller is configured to issue a warning when the torque parameter exceeds an upper limit.

8. The machine of claim 1, wherein the display part is configured to display the torque parameter and the speed parameter almost in real-time with driving of the motor.

9. The machine of claim 2, wherein the display part is configured to display the torque parameter and the speed parameter almost in real-time with driving of the motor.

10. The machine of claim 3, wherein the display part is configured to display the torque parameter and the speed parameter almost in real-time with driving of the motor.

11. The machine of claim 1, wherein the display part is configured to show change rates of the torque parameter and the speed parameter using widths or thicknesses of a line of the graph.

12. The machine of claim 2, wherein the display part is configured to show change rates of the torque parameter and the speed parameter using widths or thicknesses of a line of the graph.

13. The machine of claim 3, wherein the display part is configured to show change rates of the torque parameter and the speed parameter using widths or thicknesses of a line of the graph.

14. The machine of claim 1, wherein the display part is configured to show any one of a temperature change of the motor, a rotation direction of the shaft of the motor, and a position or work process of a control target to be operated by the motor using colors of a line of the graph.

15. The machine of claim 2, wherein the display part is configured to show any one of a temperature change of the motor, a rotation direction of the shaft of the motor, and a position or work process of a control target to be operated by the motor using colors of a line of the graph.

16. The machine of claim 3, wherein the display part is configured to show any one of a temperature change of the motor, a rotation direction of the shaft of the motor, and a position or work process of a control target to be operated by the motor using colors of a line of the graph.

17. A display method performed in an electric machine comprising a motor, a current controller supplying a current to the motor, a detector detecting a position, a speed, or an acceleration of a shaft of the motor, a controller transmitting a current instruction that specifies a supply current to the motor to the current controller, and a display part, the method comprising:
   causing the controller to calculate a torque parameter indicating a torque of the motor based on the current instruction that specifies a supply current to the motor;
   causing the controller to calculate a speed parameter indicating a rotational speed of the shaft of the motor based on a detection result from the detector; and
   causing the display part to display a graph showing a relation between the torque parameter and the speed parameter, wherein one of a horizontal axis and a vertical axis of the graph represents the torque parameter and the other of the horizontal axis and the vertical axis represents the speed parameter.

18. The method of claim 17, wherein
the torque parameter is any one of a current value supplied to the motor, a rotation torque of the shaft of the motor, and an acceleration or pressure of a control target to be operated by the motor, or is calculated from any one thereof, and
the speed parameter is the rotational speed of the shaft of the motor, or is calculated from either a position or an acceleration of the shaft of the motor.

19. The method of claim 17, wherein
the torque parameter has an upper limit, and
the controller is configured to control the current controller and the motor to prevent the torque parameter from exceeding the upper limit.

* * * * *